SELF-BIASED SOLID AMPLIFIER

Filed April 23, 1948 2 Sheets-Sheet 1

INVENTORS: H. L. BARNEY
R. C. MATHES
BY Harry C. Hart
ATTORNEY

SELF-BIASED SOLID AMPLIFIER

Filed April 23, 1948 2 Sheets-Sheet 2

INVENTORS: H. L. BARNEY
R. C. MATHES
BY Harry C. Hart
ATTORNEY

Patented Aug. 8, 1950 2,517,960

UNITED STATES PATENT OFFICE 2,517,960

SELF-BIASED SOLID AMPLIFIER

Harold L. Barney, Madison, and Robert C. Mathes, Maplewood, N. J., assignors to Bell Telephone Laboratories, Incorporated, New York, N. Y., a corporation of New York Application April 23, 1948, Serial No. 22,854

18 Claims. (Cl. 179—171)

This invention relates to signal translation circuits including semiconductive elements.

The principal object of the invention is to obtain an operating bias potential for a semiconductor amplifier in a novel manner.

Another object is to adapt semiconductor amplifiers for service in unattended repeater stations.

A related object is to enable a plurality of such amplifiers to be connected in tandem, all supplied with operating potential from a single source which may be located at a remote point.

In an application of John Bardeen and W. H. Brattain, Serial No. 11,165, filed February 26, 1948, now abandoned, and now superseded by a continuation-in-part application of the same inventors, Serial No. 33,466, filed June 17, 1948, there is described a circuit element comprising a small block of a semiconductive material such as germanium which possesses remarkable amplifying properties. The body of the block is of one conductivity type, for example N-type, while one surface has been given a sensitizing treatment which is believed to alter the conductivity type of a thin surface layer to P-type, which layer is believed to be separated from the body of the block by a high resistance barrier. Two electrodes, denoted emitter and collector, respectively, make rectifier contact with the treated surface while a third electrode, which may be a plated metal film, makes low resistance contact with the opposite face, namely, the base of the block. The discovery of the amplifying properties of the device was made with the third electrode connected to ground, with the emitted biased positively by a battery to a volt or so and the collector biased negatively to about —40 to —100 volts by another battery. A signal to be amplified was applied between the emitter and ground and an amplified replica appeared across a load connected in series with the collector battery, between the collector electrode and ground.

In the course of a study of the properties of the circuit element of the aforementioned Bardeen-Brattain application when its electrodes are interconnected with the emitter connected to ground, it has now been discovered that the signal frequency amplification phenomenon is accompanied by the flow of a steady current through the body of the block, which current is substantially independent of the signal. In accordance with the present invention, a resistor of suitable magnitude is included in the input circuit between the emitter and the control electrode, and the steady current is turned to advantage by producing a voltage drop across this resistor of correct magnitude and sign to produce the proper bias potential. Thus the input bias battery may be dispensed with. The resistor may now be by-passed for signal frequencies by a condenser.

By virtue of the invention, the unit is rendered fully operative by a single power source connected in the collector circuit. This makes possible the construction of a multistage amplifier of which the collector electrodes of all stages are supplied with power in parallel from this one source. It also helps to adapt the unit for service at an unattended repeater station, power being supplied to it from a remote source by way of a transmission line which may, at the same time, carry signal energy.

Various other features and objects of the present invention will be fully apprehended from the following detailed description of certain preferred embodiments thereof taken in connection with the appended drawings in which.

Figure 1:
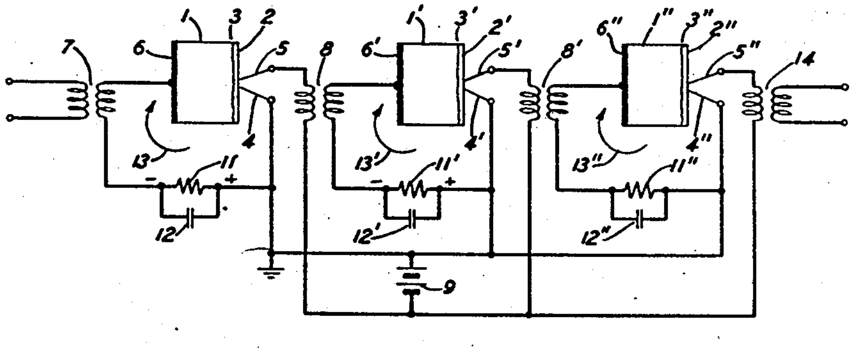
Fig. 1 is a schematic circuit diagram showing a three-stage semiconductor amplifier embodying the invention.

Referring now to the figures, Fig. 1 shows an amplifier of three like stages coupled in tandem between an input circuit represented by a transformer and an output circuit represented by another transformer. The heart of each amplifier stage is a three-electrode semiconductor unit of the type which forms the subject-matter of the aforesaid Bardeen-Brattain application. In brief and as a preferred example, it may be a small block 1 of N-type germanium prepared in accordance with the teachings of an application of J. H. Scaff and H. C. Theuerer Serial No. 638,351, filed December 29, 1945 and to one surface 2 of which a sensitizing treatment has been applied, for example an anodic oxidation process as described and claimed in an application of R. B. Gibney, Serial No. 11,167, filed February 26, 1948.

Two electrodes 4, 5 which may be metal points, make rectifier contact with the sensitized surface of the block 1, preferably close together. They are denoted the emitter and the collector, respectively. A third electrode 6, denoted the control electrode, makes low resistance contact with the opposite face of the block 1. It may be a plated metal film. A signal to be amplified may be applied to the first stage by way of an input transformer 7 whose secondary winding is connected between the emitter 4 which may be at ground potential, and the control electrode 6. The output circuit of the device includes the primary winding of a transformer 8 by which the first stage is coupled to the second. This primary winding is connected directly between the collector electrode 5 and the negative terminal of a potential source 9 of −40 to −100 volts whose positive terminal is grounded.

According to current theories as to the operation of the device, the surface treatment to which the semiconductor block has been subjected results in the formation on the surface of a thin layer 2 of P-type material, perhaps $10^{-5}$ centimeters in thickness, separated from the body 1 of the block by a high resistance barrier 3. With the emitter 4 biased positively with respect to the body 1 of the block by a volt or so and the collector 5 negatively by 40 to 100 volts, the emitter 4 operates in the forward direction and the collector in the reverse direction. These terms are familiar in the point contact rectifier art. As a consequence, positive mobile charges flow from the emitter to the block but, because the transverse resistance of the barrier 3 is considerably higher than the lateral resistance of the surface layer 2, these positive charges travel laterally in the surface layer away from the emitter, rather than immediately crossing the barrier.

In the course of this lateral spread of current, it comes within the influence of a strong electric field which exists in the neighborhood of the collector 5, i. e., between it and fixed charges in the body of the material. The mobile charges are here collected and flow out of the layer by way of the collector electrode.

A signal applied between the emitter 4 and the body 1 of the block produces an electric field whose strength is greatest across the barrier 3. This field modifies the current of charges flowing from the emitter to the surface layer, and so the current in the external collector circuit and the voltage across a suitable load. Thus amplification is obtained.

In the Bardeen-Brattain application, the control of the emitter current by a signal applied between the emitter and the body of the block is exerted only when a suitable bias is applied by way of a battery between the body of the block and the emitter electrode.

The present invention is based upon the discovery that in addition to the current in the work circuit, a current also flows, under the influence of the potential source, through the body of the block and across the high resistance barrier 3, if present. This current is, at least to a good approximation, independent of the magnitude of the signal, and exists in the absence of such signals. In accordance with the invention, therefore, a resistor 11 is included in the circuit which carries this current, and the voltage drop across this resistor provides the required bias between the emitter electrode 4 and the body of the block or control electrode 6. The direction of the current flowing in this circuit is indicated in the figure by an arrow 13 and the sign of the consequent voltage drop across the resistor 11 is indicated by a plus sign at the emitter end and a minus sign at the control electrode end of the resistor 11.

The value of the required resistor for best operation depends, of course, on the particular characteristics of the sample being employed, as well as on the magnitude of the potential source 9 and the resistance of the external load. An average value, based on the examination of a number of such samples, is about 300 ohms. The average value of the current in the emitter-control electrode circuit is about 2 to 3 milliamperes. Therefore, the voltage drop across this resistor 11 is of the order of 0.7 volt, a value which has given satisfactory results on a number of samples.

In accordance with a further aspect of the invention, a condenser 12 is connected in shunt with this bias resistor 11 to provide a low impedance path for signal frequency currents. The capacitance value of this condenser 12 depends on the range of frequencies with which the device is to be employed. In general the rule to be followed in selecting the condenser is that its reactance shall have a value approximately equal to the resistance value of the resistor at the lowest frequency to be encountered. Thus, for voice frequencies, a condenser of 2 microfarads or so may be employed.

Amplified signal frequency energy appearing in the primary winding of the output transformer 8 of the first stage is passed by way of this transformer to the second stage of the three-stage amplifier of Fig. 1, where it appears applied between the emitter 4′ and the control electrode 6′ of a semiconductor triode amplifier which may be similar to that of the first stage. Inasmuch as with the connections of the invention, only one potential supply is required for a number of stages, the collector electrode 5′ of the second stage may be connected through the primary winding of an interstage transformer 8′ to the negative terminal of the same potential source 9. As in the case of the first stage, a resistor 11′ is included in series between the emitter electrode 4′ and the secondary winding of the interstage transformer 8 to provide a bias of appropriate magnitude for the control electrode 6′. As in the case of Fig. 1, an arrow 13′ indicates the direction of the current in the emitter-control electrode circuit and the algebraic signs at either end of the resistor 11′ indicate the sense of the resulting voltage drop across it. This resistor may again be by-passed by a condenser 12′ to provide a low impedance path at signal frequencies.

As many stages as may be desired may be coupled in tandem, a third stage being shown in the figure for illustrative purposes coupled to the second stage in the same manner as that in which the second stage is coupled to the first, supplied with operating potential from the same potential source 9 as was employed for the first stage and the second, and having in its emitter-control electrode circuit a biasing resistor 11″ shunted by a by-pass condenser 12″. The signal frequency energy, now amplified in succession by all three stages, is supplied by way of an output transformer 14 to a suitable load.

Figure 2:
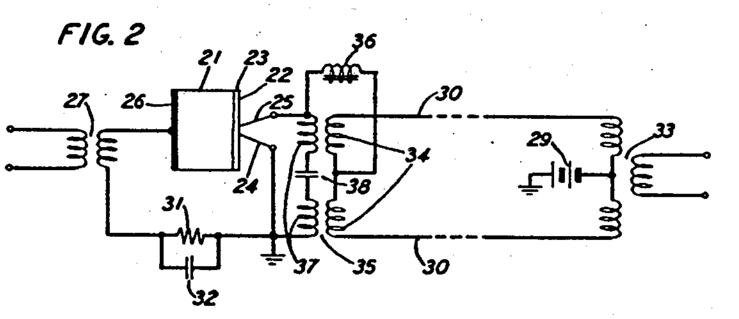
Fig. 2 is a schematic circuit diagram of a semiconductor amplifier suitable for use as a telephone repeater.

The invention also lends itself to use at a repeater station, such as a telephone repeater which may be installed in a location which is remote from the power sources. Fig. 2 shows such an arrangement wherein an input signal is applied by way of a transformer 27 to a semiconductor amplifier which may be the same as any of the stages of Fig. 1 and to which a suitable operating bias is applied by way of the resistor 31 of the invention which, again, may be by-passed by a condenser 32 to provide a low impedance path at signal frequency. The necessary operating potential may be supplied from a potential source such as a battery 28 which may be located at a point geographically separated from and electrically connected to the amplifier by way of a transmission line 30 which in the practical case may be many miles in length. The potential source 29 has its positive terminal connected to ground and its negative terminal connected to the mid-point of one winding of a transformer 33 whose end terminals are connected to the two conductors of the transmission line 30 which is terminated at the repeater station in a winding 34 of a transformer 35. The mid-point of this transformer winding is connected by way of a retard coil or choke 36 to the collector electrode 25 of the amplifier. Thus the two conductors of the transmission line 30 supply operating potential to the collector electrode 25 in parallel. Amplified signal frequency energy appears across the primary windings 37 of the transformer 35 and is inductively coupled to the transmission line terminal windings 34, so that, from the standpoint of the signal, the transmission line conductors are in series. At the far end of the line, the signal frequency energy is again transferred by inductive action to the secondary winding of the transformer 33 and thence to a load.

To prevent the application of negative operating potential to the emitter electrode 24 and indeed, to prevent short-circuiting the potential source 29, a condenser 38 having a large admittance at signal frequencies but a substantially infinite impedance at zero frequency may be included in the circuit of the collector electrode.

Figure 3:
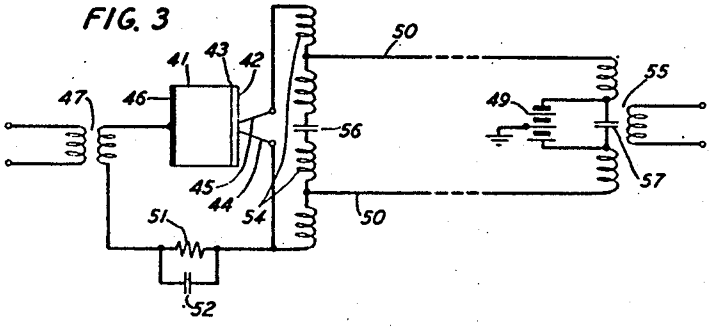
Fig. 3 is a schematic circuit diagram of a modification of Fig. 2.

Fig. 3 shows a modification of Fig. 1 in which the semiconductor triode amplifier is again supplied with operating bias by way of a resistor 51 connected in series between the emitter 44 and the control electrode 46, the resistor 51 being by-passed for signal frequency energy by a condenser 52. Operating potential derived from a potential source 49 is applied to the collector electrode 45 by way of a transmission line 50 which is connected at the repeater station end to appropriate points of an auto-transformer 54 connected in the output circuit of the device and at the other end to the primary winding of an output transformer 55. At each end of the line a condenser 56, 57 is included in the circuit to isolate the collector electrode 45 from the emitter electrode 44 and from ground for direct current. The potential source 49 has its positive terminal connected to one terminal of the isolating condenser 57 and its negative terminal connected to the other terminal. The first terminal is connected by way of one half of the primary winding of the output transformer 55 and a portion of the repeater load circuit auto-transformer 54 to the emitter 44 while the other terminal of the condenser 57 is connected by way of the other half of the output transformer winding and another portion of the repeater load circuit auto-transformer 54 to the collector electrode 45.

As with Fig. 2, this arrangement is capable of operating at a remote point and unattended, the entire power supply required, which consists solely of operating potential for the collector, being supplied to it by way of the signal frequency transmission line.

Figure 4:
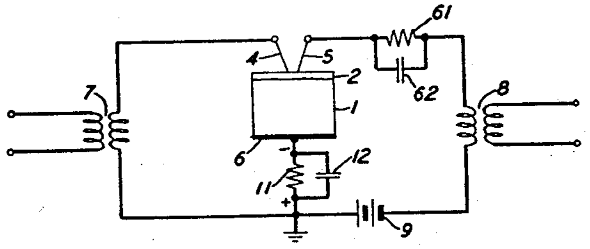
Fig. 4 is a schematic circuit diagram illustrating the application of the invention to the grounded control electrode circuit arrangement.

The invention is not limited to use with amplifier circuits in which the emitter is grounded, but is applicable as well to circuit arrangements of the grounded control electrode and grounded collector configurations. Thus Fig. 4 shows an amplifier circuit of the grounded control electrode type, comprising a semiconductive block of similar construction and electrode arrangement to the block of Fig. 1, with its electrodes interconnected in the manner which, for vacuum tube triodes, is known as the "grounded grid" circuit. Thus input signal energy is applied by way of a transformer 7 to the emitter 4 and the control electrode 6, while amplified output energy is delivered by way of an output transformer 8 in the circuit of the collector 5 and the control electrode 6. A self-bias resistor 11, by-passed by a condenser 12, furnishes a potential drop of the polarity indicated by the "plus" and "minus" signs, due to current flowing through the block from the battery 9. By selection of the magnitude of the resistor, this potential drop may be adjusted to hold the control electrode at the best bias potential with respect to the emitter 4.

As a refinement, a protective resistor 61 may be included in the circuit of the collector electrode 5 to prevent damage to the collector point contact due to current of excessive magnitude. This protective resistor may, if desired, be by-passed for signal frequencies by a condenser 62. This arrangement, although shown only in Fig. 4, may be employed, if desired, in the arrangements of any of the other figures. However, equivalent protection is provided in Fig. 6 by the load resistor in the emitter circuit.

Figure 5:
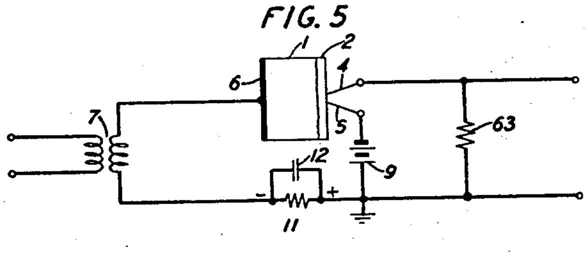
Fig. 5 is a schematic circuit diagram illustrating the application of the invention to the grounded collector circuit arrangement.

Fig. 5 shows the self-bias resistor 11 and condenser 12 combination as applied to a semiconductor amplifier of which the electrodes are interconnected in the manner which, for vacuum tube triodes, is known as the "grounded anode" or "cathode follower" circuit. Here the resistor 63, connected between ground and the emitter electrode 4, constitutes the loading impedance of the circuit. The resistor 11, by-passed by the condenser 12, furnishes a bias for the control electrode 6, due to the flow of block body current through the resistor under the influence of the collector battery 9.

Correct value of the bias potential of the control electrode 6 with respect to the emitter electrode 4 may also be obtained in another way, namely by the use of a bleeder resistance. Thus in Fig. 6, which except for the omission of the resistance 11 and the condenser 12, and the insertion of a resistor 64 and a condenser 65 is the same as Fig. 5, consider the distribution of potentials among the electrodes 4, 5 and 6, if the condenser 65 were short-circuited and the resistor 64 omitted. Because the emitter is worked in its forward direction and the collector in its reverse direction, the block manifests a resistance of a few hundred ohms between the control electrode and the emitter, a resistance of a few thousand ohms between the control electrode and the collector, and a resistance of intermediate value between the emitter and the collector. The control electrode has the highest potential and the collector the lowest, while the potential of the emitter is intermediate, being reduced below the control electrode potential by the drop through the load resistor 63.

For best operation, however, it is required that the potential of the control electrode be the intermediate one. This result can be approximately secured by blocking the passage of direct current by including the condenser 65 in series with the control electrode 6. The direct current potential of the control electrode now floats slightly below that of the emitter and it may be brought precisely to the proper value and held there by connection of a resistor 64 of suitable magnitude between the control electrode and a point of suitable potential on the battery 9. Good results have been obtained with a resistor 64 of a few hundred thousand ohms, connected to the negative battery terminal, though other tapping points, with resistor magnitudes chosen to suit, may be employed if desired. Thus a resistor 66 is shown in broken lines connected from the control electrode to the positive battery terminal. The resistors 64 and 66 together constitute a potentiometer across the battery 9, to a suitable point of which the control electrode 6 may be connected. It has been found that the required magnitude of the resistor 66 is many megohms, so that in practice it may be entirely omitted.

With this arrangement, the direct biasing current is excluded from the signal source, which in this case is the secondary winding of the transformer 7. Because the magnitude of the resistor 64 is much higher than the input resistance of the device, loading of the input circuit by the resistor is negligible.

Figure 6:
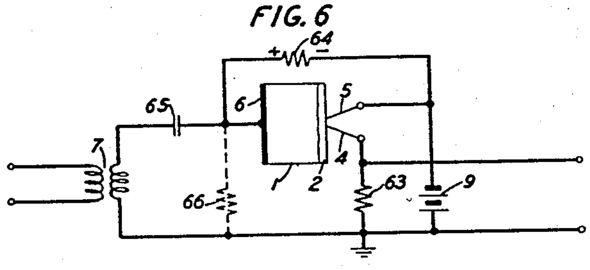
Figs. 6 and 7 are schematic circuit diagrams of modifications of parts of Fig. 1.
Figure 7:
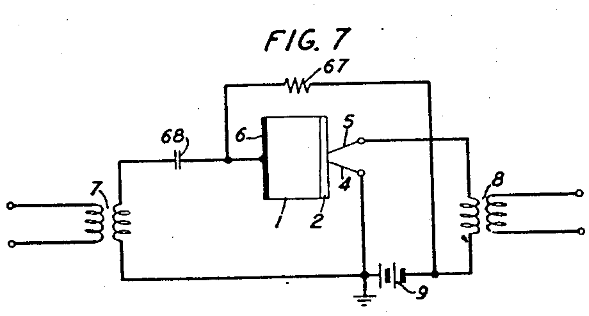

Fig. 7 shows an arrangement similar to Fig. 6 but for the fact that the circuit is of the grounded emitter type. Here again, a condenser 68 is placed in series with the input transformer 7 and a resistor 67 of high value is connected from the control electrode 6 either directly to the collector electrode 5 or, preferably, to the negative terminal of the battery 9 which is in turn connected by way of the primary winding of the output transformer 8 to the collector 5. With the preferred arrangement, signal frequency voltages are virtually excluded from the resistor 67, though from the direct current or bias standpoint, the arrangements are substantially alike. The explanation given above of the operation of the circuit of Fig. 6 is applicable to the circuit of Fig. 7. The resistor 67, when adjusted to a suitable value which in certain cases has turned out to be of the order of a few hundred thousand ohms, holds the potential of the control electrode 6 at a value intermediate between the potential of the emitter 4 and the potential of the collector 5, namely, a volt or so negative with respect to the emitter. As before, the function of the condenser 68 is to prevent the flow of direct currents in the input circuit, while passing signal frequency currents to the control electrode.

The biasing arrangements of Figs. 6 and 7 may be employed in any of the other figures. The circuit arrangements of Figs. 4 and 5 may be intercoupled in tandem as in Figs. 1 and 2.

While described as applied to an amplifier unit comprising a block of surface treated N-type germanium, the invention is, of course, equally applicable to units of other conductivity types and other materials and modified electrode configurations; and also to circuit configurations and uses other than the amplifiers described, such as, for example, modulators.

Various other alternative arrangements which lie within the spirit of the invention as described in the foregoing specification will occur to those skilled in the art.

What is claimed is:

1. The combination with an amplifier comprising a semiconductive body and at least three metallic electrodes making direct electrical contact with said body, signal input terminals connected with two of said electrodes and a potential source connected with one of said two electrodes and with a third electrode, of means for adjusting the bias potential of the other of said two electrodes which comprises a resistor connected between said other electrode and a point whose potential is fixed by said potential source.

2. The combination with a circuit element comprising a semiconductive body having at least two parts of opposite conductivity types and at least three metallic electrodes making direct electrical contact with said body, signal input terminals connected with two of said electrodes and a potential source connected with one of said two electrodes and with a third electrode, of means for adjusting the bias potential of the other of said two electrodes which comprises a resistor connected between said other electrode and a point whose potential is fixed by said potential source.

3. The combination with a circuit element comprising a semiconductive body and at least three metallic electrodes making direct electrical contact with said body, signal input terminals connected with two of said electrodes and a potential source connected with one of said two electrodes and with a third electrode, of means for adjusting the bias potential of the other of said two electrodes which comprises a resistor connected in series with said input terminals, and a by-pass condenser connected in shunt with said resistor.

4. In combination with a circuit element comprising a semiconductive body having therein a high resistance barrier, a first electrode and a second electrode making rectifier contact with said body on one side of said barrier, a third electrode making low resistance contact with said body on the other side of said barrier, and a source of steady potential connected to the second electrode, biasing means for adjusting the potential of the third electrode with respect to the first electrode which comprises a resistor connected in circuit with the third electrode, through which a steady current flows under the influence of the potential source and independently of the flow of signal currents.

5. In combination with a circuit element comprising a semiconductive body having therein a high resistance barrier, a first electrode and a second electrode making rectifier contact with said body on one side of said barrier, a third electrode making low resistance contact with said body on the other side of said barrier and a source of steady potential connected to the second electrode, biasing means for adjusting the potential of the third electrode with respect to the first electrode which comprises a resistor connected in circuit with the third electrode, through which a steady current flows under the influence of the potential source and independently of the flow of signal currents, and a condenser connected in shunt with said resistor.

6. In combination with a circuit element comprising a block of semi-conductive material of which the body is of one conductivity type and a thin surface layer, separated from the body by a high resistance barrier, is of opposite conductivity type, an emitter electrode making contact with said layer, a collector electrode making rectifier contact with said layer, a control electrode connected to the body of said block, and a potential source for biasing the collector electrode, means for biasing the emitter electrode with respect to the body of the block which comprises a resistor connected in circuit with the emitter electrode and said control electrode, which resistor carries a steady current all of which crosses said barrier.

7. In combination with a circuit element comprising a block of semiconductive material of which the body is of one conductivity type and a thin surface layer, separated from the body by a high resistance barrier, is of opposite conductivity type, a first electrode making contact with said layer over an area which is small as compared with the layer area and adopted to inject charges into the layer, a second electrode in contact with said layer disposed to collect current spreading in said layer from said first electrode, a third electrode connected to the body of said block and disposed to influence the magnitude of said spreading current and a potential source for biasing said second electrode, means for biasing the first electrode with respect to the body of the block which comprises a resistor connected in circuit with said first electrode and said third electrode, which resistor carries a steady current all of which crosses said barrier.

8. In combination with a circuit element comprising a semiconductive body having at least two parts of opposite conductivity types, three electrodes making contact with said body, of which one makes contact at one of said parts, another makes contact at the other of said parts, and the third eelctrode makes contact elsewhere on said body, a potential source connected in circuit with two of said electrodes, and biasing means for the remaining one of said electrodes which comprises a resistor connected in circuit with said remaining electrode and carrying a steady current all of which flows through said body.

9. Apparatus as defined in the preceding claim wherein a by-pass condenser is connected in shunt with the resistor.

10. An amplifier adapted to be connected between an input circuit and an output circuit, which comprises a plurality of similar stages coupled in tandem, each stage comprising a semiconductor triode having an emitter electrode, a control electrode and a collector electrode, the input circuit of each stage comprising the first two named electrodes, the output circuit of each stage comprising one of the first two named electrodes and the collector electrode, the collector electrodes of said triodes being connected, by way of individual coupling impedances, to a common potential source, and control electrode biasing means individual to each of said stages, each of said means comprising a resistor connected in circuit with the control electrode of the semiconductor triode of said stage.

11. Apparatus as defined in the preceding claim wherein a by-pass condenser is connected in shunt with the resistor.

12. In combination with an active transducer comprising a semiconductive body having in contact with the surface thereof an emitter electrode, a collector electrode and a control electrode, and a potential source for activating said collector electrode, a resistor included between the emitter electrode and the control electrode for deriving a steady bias potential from current of said source flowing through said body.

13. In combination with an active transducer comprising a semiconductive body having in contact with the surface thereof an emitter electrode, a collector electrode and a control electrode, and a potential source for activating said collector electrode, a resistor included between the emitter electrode and the control electrode for deriving a steady bias potential from current of said source flowing through said body, and a condenser connected in shunt with said resistor.

14. In an active transducer comprising a semiconductive body, at least two electrodes in contact with one face of the body, at least one electrode in contact with another face of the body, and a source of potential connected between two of the electrodes, means for deriving a bias potential for one of said electrodes which comprises a resistor connected to said electrode and carrying a current all of which flows through the body independently of the application of signals to the transducer.

15. In combination with an active transducer comprising a semiconductive body having in contact with the surface thereof an emitter electrode, a control electrode, and a collector electrode, a potential source, a protective resistor and a load impedance connected in series with said collector electrode, and a self-bias resistor connected in series with said control electrode for driving a steady bias potential from currents of said source flowing through said body independently of the application of signals to the transducer.

16. The combination with a circuit element comprising a semiconductive body having in direct electrical contact therewith an emitter electrode, a control electrode and a collector electrode, a signal input source connected in circuit with said emitter electrode and said control electrode and a potential source connected in circuit with said emitter electrode and said collector electrode, of a self-bias resistor connected in series with said control electrode for deriving a steady bias potential from currents of said source flowing through said body independently of the application of signals of said source.

17. The combination with a circuit element comprising a semiconductive body having in direct electrical contact therewith an emitter electrode, a control electrode and a collector electrode, a signal input source connected in circuit with said emitter electrode and said control electrode and a potential source connected in circuit with said control electrode and said collector electrode, of a self-bias resistor connected in series with said control electrode for deriving a steady bias potential from currents of said source flowing through said body independently of the application of signals of said source.

18. The combination with a circuit element comprising a semiconductive body having in direct electrical contact therewith an emitter electrode, a control electrode and a collector electrode, a signal input source connected in circuit with said control electrode and said collector electrode and a potential source connected in circuit with said emitter electrode and said collector electrode, of a self-bias resistor connected in series with said control electrode for deriving a steady bias potential from currents of said source flowing through said body independently of the application of signals of said source.

HAROLD L. BARNEY.
ROBERT C. MATHES.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,877,140 | Lilienfeld | Sept. 13, 1932 |
| 1,900,018 | Lilienfeld | Mar. 7, 1933 |
| 1,949,383 | Weber | Feb. 27, 1934 |